C. G. IHRMARK.
TOOL HOLDER.
APPLICATION FILED SEPT. 27, 1917.
1,311,897.
Patented Aug. 5, 1919.
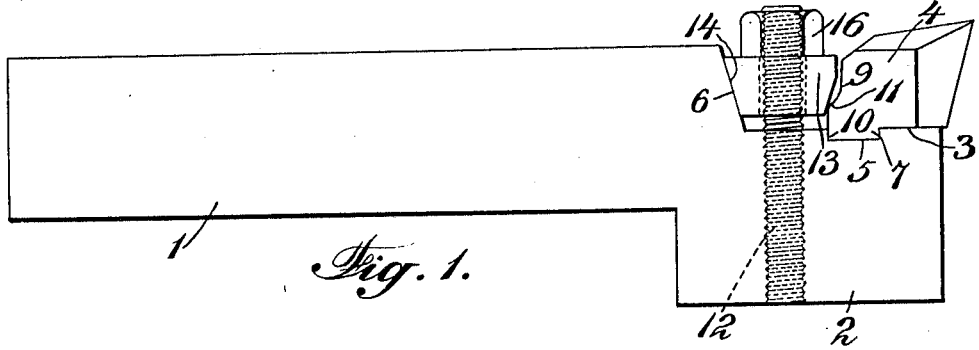
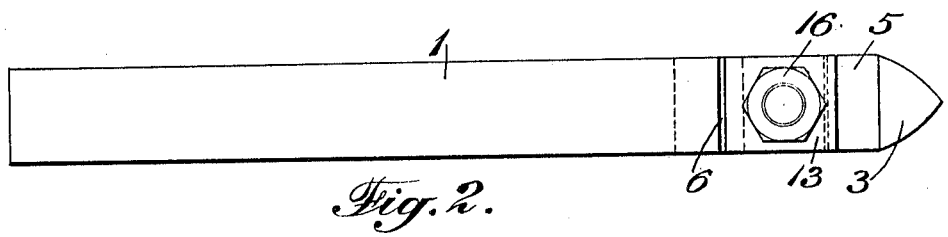
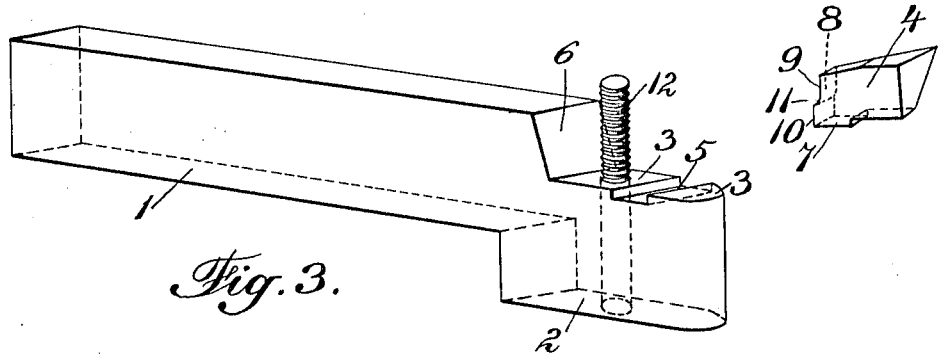
INVENTOR
Charles Gideon Ihrmark
BY
Joseph K. Schofield
ATTORNEY

UNITED STATES PATENT OFFICE.

CHARLES GIDEON IHRMARK, OF EASTON, PENNSYLVANIA, ASSIGNOR TO INGERSOLL-RAND COMPANY, OF JERSEY CITY, NEW JERSEY, A CORPORATION OF NEW JERSEY.

TOOL-HOLDER.

1,311,897.     Specification of Letters Patent.     Patented Aug. 5, 1919.

Application filed September 27, 1917. Serial No. 193,487.

*To all whom it may concern:*

Be it known that I, CHARLES GIDEON IHRMARK, a citizen of the United States, residing at Easton, in the county of Northampton and State of Pennsylvania, have invented a certain new and useful Improvement in Tool-Holders, of which the following is a specification.

This invention relates to tools such as are used in lathes, planers and similar machine tools, and in particular relates to a tool of this type having a detachable cutter.

The objects of the present invention are to construct a tool of the type above mentioned being simple in construction, easy to operate and more especially admitting cutters to be changed easily and adapted to hold the cutter rigidly in position in the holder when the tool is being used.

In the drawing annexed hereto and forming a part of this specification:

Figure 1 shows a side view of the complete tool with cutter in place;

Fig. 2, a top view of the same;

Fig. 3, the holder in perspective;

Fig. 4, the cutter detached from the tool;

Fig. 5, the wedge block;

Fig. 6, the nut for clamping the wedge block to the holder.

Referring more particularly to the figures, of the drawings, 1 refers to the shank of the tool-holder and 2 the head with which the shank is provided. The head 2 is provided at its forward end with a flattened portion 3 on which rests the cutter 4. The flattened portion 3 is provided about midway of its distance from the front edge with a transverse slot 5, which extends from side to side of the tool holder and is preferably of rectangular cross-section. The tool holder head 2 is further provided with a surface 6 slightly oblique and extending from the surface 3 for a purpose presently to be described.

The cutter 4 may have any form of cutting point, the one shown being of the conventional "diamond" form and is provided on its lower edge with a projection 7 closely fitting the transverse slot 5. The rear surface 8 of the cutter 4 is vertical at its upper portion as shown at 9 and has an offset vertical surface 10 at its lower portion joined to the surface 9 by an oblique surface 11. Extending vertically through the tool holder head 2 in rear of the slot 5 is a threaded stud 12 which is tightly screwed in the head 2 and extends somewhat above the flattened portion 3. Slidably mounted on the stud 12 is a wedge or angle block 13 having a surface 14 tapered to correspond to the surface 6 of the tool holder head 2. The forward surface 15 of the wedge or angle block 13 is shaped to fit against parts of the rear surface of the cutter 4 as clearly shown in Fig. 1 of the drawings.

Above the wedge block 13 and threaded on the stud 12 is a nut 16 by means of which the wedge block 13 is set up firmly against the cutter 4, thus holding it securely in position with its lower surface in contact with the flattened portion 3 of the tool holder head 2 and with its projection 7 within the transverse slot 5.

It will thus be seen that with the wedge block clamped in place as above described, a tool is provided in which the cutter is rigidly held in position while in use but which by simply loosening the nut 16 may be detached from its holder and changed for another cutter or may be readily re-sharpened.

It is to be understood that while the present showing and description disclose only one specific embodiment of this present invention, other forms and modifications are included within the spirit and scope thereof, as expressed in the appended claims.

What I claim is:

1. In a tool of the class described, in combination, a tool holder having a shank and a head, said head being provided with a transverse slot, a tool having a projection fitting said slot and clamping means for said tool comprising a wedge block having upwardly and outwardly slanting ends respectively engaging the shank and tool, and means for securely holding said wedge block in position.

2. In a tool of the class described, in combination, a tool holder having a shank and a head, said head being provided with a flattened portion and a transverse slot, a tool adapted to rest on said flattened portion of the tool holder and having a projection adapted to fit said slot, and means for clamping said tool in said holder comprising a wedge block having a flat lower surface, a flat top surface and opposite obliquely tapered sides adapted to engage a face of the tool and an angular face on the tool holder and means for securely holding said wedge block in position.

In testimony whereof I have hereunto set my hand.

CHARLES GIDEON IHRMARK.